United States Patent Office 2,914,431
Patented Nov. 24, 1959

2,914,431

REFINING STARCH HYDROLYSATES

Elliott P. Barrett, Baltimore, Md., and Robert S. Bowman, Pittsburgh, Pa.

No Drawing. Application February 6, 1958
Serial No. 713,553

12 Claims. (Cl. 127—40)

This invention relates to the refining of starch hydrolysates, e.g. corn syrup, glucose and dextrose, and more particularly to an improved process of such refining that provides improved color stability and possesses other advantageous properties as will appear as well as to improved adsorbents for that purpose.

For many years bone char (bone black, bone coal, animal charcoal) has been used as a refining aid in the manufacture of starch hydrolysates. The bone char, in granular form, is disposed in cylindrical steel or iron vessels and the liquors containing the hydrolysate flow downward through the bed of adsorbent and emerge from the bottom with reduced content of colorants, color precursors and other undesirable impurities. When the depurative power of the adsorbent has become inefficient or depleted, hydrolysate feed is stopped and the residual liquor is displaced from the filter with water. The adsorbent is then washed with additional water to remove as much as possible of the adsorbed impurities. The char is then removed from the filters and passed through driers and kilns whereby its activity is more or less restored. This kilning process is commonly called "reburning" and the term will be used hereafter for convenience.

The reburned char is then returned to the filters where in accordance with customary practice it is treated with dilute hydrochloric acid (HCl) to eliminate excessive alkalinity that results from the reburning process. This acidulation, commonly called "acid tempering," is essential to the process because the hydrolysates to be treated must be maintained at the lowest practical pH to minimize the apparent color of the natural colorants and to minimize the rate of production of colorants from the so-called "color precursors" (e.g. hydroxymethyl furfural) present in the liquors. The optimum pH from this viewpoint is considered to be in the range from 3.0 to 4.0 but, because the liquors are processed through iron and steel equipment, their pH is maintained in the vicinity of pH 5.0, generally from about 4.8 to 5.2.

Because the principal inorganic component of bone char is a complex phosphate approximating the composition of calcium hydroxyapatite $$[3Ca_3(PO_4)_2.Ca(OH)_2]$$

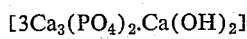

and because this phosphate when subjected to the elevated temperatures necessary to regenerate the char in reburning develops excessive alkalinity to such an extent that the pH of its aqueous extract may be as high as 8.0 to 10.0, it is obvious that bone char is not an ideal adsorbent for the purpose because, as explained above, it must be acid tempered to destroy such excess alkalinity.

The acid tempering step is disadvantageous for many reasons. Obviously, it introduces into the refining process an extra operation which consumes time and acid. Particularly undesirable is, however, the very large quantity of hot water which must be used to remove the excess acid and other water soluble impurities from the tempered char. In a large refinery the cost of this wash water amounts to many thousands of dollars annually.

Another disadvantage of acid tempering is that it weakens the physical structure of the char by leaching out a portion of the phosphatic substrate each time the tempering step is repeated. This lowers the resistance of the char to abrasion and crushing so that more new char than otherwise would be necessary must be added as make-up to maintain the necessary volume of char in the filters. Moreover, the direct loss of material by solution due to acid tempering adds to the char losses, and in addition, as we have observed, this results in a deterioration in char activity. It is known that old service chars, and particularly the finer grists of such chars, are much higher in carbon content than new bone chars. We have found that such old service chars are low in depurative power and we believe this is due to a collapse of the original char structure consequent upon the leaching out, in acid tempering, of the phosphatic substrate which, it appears, leaves the carbon in a condition such that its depurative power is much impaired.

A further disadvantage of the acid tempering step is that it is extremely difficult to wash out all the residual phosphatic material solubilized by the acid. In consequence, appreciable quantities of calcium and phosphorous-bearing compounds pass into the hydrolysate liquors subsequently treated with the char. This results in a progressive deposition of calcium and phosphorous-bearing compounds on the heating surfaces of the evaporators when the liquors are subsequently concentrated. Also, as not infrequently happens, dissolved calcium from the phosphatic substrate of the char passes into liquors containing dissolved sulfates. This results in the formation of a suspension of calcium sulfate that is so finely subdivided that it cannot be removed by mechanical filtration. This detracts from the brilliancy of the finished product which, consequently, must be reprocessed at excessive expense to eliminate the haze.

Recently two alternative adsorbents to bone char have found application in refining of starch hydrolysates, but neither has made possible the elimination of the acid tempering step. One of these, a synthetic bone char contains carbon, calcium hydroxyapatite and clay binder. Although the apatite content of this material is lower tahn that of natural bone char, it still requires to be acid tempered following reburning due to the alkalinity developed by its apatite content. The other adsorbent, a granular activated charcoal contains no apatite but it does contain inorganic impurities which require it to be acid tempered after reburning both to remove excess alkalinity and appreciable amounts of water soluble impurities.

One object of the invention is to provide adsorbents which will effect a greater decolorization of starch hydrolysates than is accomplished by bone char and the process by which it is presently used, or to effect the same decolorization with the use of a smaller proportion of adsorbent to product.

Another object is to eliminate the step in the starch hydrolysate refining operation known as "acid tempering" of the depurative adsorbent, after reburning, thereby eliminating the necessity for using large quantities of wash water to free the adsorbent from residual acid and other water soluble impurities.

Still another object is to provide adsorbents which can be so regenerated in the vertical tube kilns used by refiners of starch hydrolysates as to yield a regenerated adsorbent possessing the desired pH characteristics without additional processing subsequent to the thermal regeneration, or reburning, process.

A further object is to provide adsorbents for the stated purposes that are of improved particle size stability due to increased resistance to crushing and abrasion, and also by conferring chemical inertness with respect to acidic solutions upon them. Associated with this objective, the accomplishment of which provides adsorbents of enhanced physical life, is the object of imparting an increased porosity to the adsorbents so that their activity as adsorbents does not deteriorate as rapidly from cycle to cycle of use and regeneration as do adsorbents presently used for this purpose.

Yet another object is to provide adsorbents which will not contaminate the starch hydrolysate liquors treated with them with amounts of calcium and phosphorus-bearing compounds which tend to deposit on the heating surfaces of evaporators, thereby impairing their efficiency, and thus to avoid reaction of such compounds with sulfates dissolved in the liquors whereby haziness due to the precipitation of calcium sulfate in the liquors is suppressed.

Another object is to provide a simple, efficient, easily practiced and inexpensive method of making adsorbents in accordance with the foregoing objects.

Additional objects are to provide adsorbents which do not contaminate the products treated with them with inorganic or organic impurities detrimental to the products, and which cause less corrosion when in contact with steel and iron equipment than some of the carbonaceous adsorbents presently used in the art.

Other objects will appear from the following specification.

The invention is predicated upon our discovery that when an intimate mixture of hydrated alumina with minor amounts of carbonizable organic matter and a naturally alkaline clay is heated in the substantial absence of air to carbonize the organic matter, dehydrate the alumina and sinter the clay there are produced granular products that, in accordance with objects of the invention, are suitable adsorbents for treating starch hydrolysates and which can be acid treated at the end instead of the beginning of the filtration operation. In other words, subsequent to the acid treatment and water washing our new adsorbents can be reburned without developing excess alkalinity or releasing water soluble inorganic or organic impurities, and without requiring acid tempering after reburning.

It is important to recognize the distinction between, on the one hand, acid treatment incidental to the water washing done at the end of the filtration operation, and, on the other hand, the current practice of acid tempering after reburning the char. The latter step involves a wholly separate and additional operation entirely unrelated to the washing out of impurities from the char after its depurative properties have become exhausted and which must be accomplished regardless of what granular adsorbent is used. What our new adsorbents eliminate is the acid washing, or tempering, with concomitant washing operation which presently is applied to the char after reburning. The major cost of acid tempering is not the cost of the acid; it is the cost of the extra washing with water. In effect our new adsorbents cut in half both the washing time and the volume of hot water used in washing.

Any alkaline clay which on heating develops sufficient mechanical strength to bind the granules is adaptable to our purpose. We prefer to use attapulgite clays such as those occurring in Florida and Georgia, but our invention is not limited to these clays.

As a source of organic matter, starch is preferred but other carbohydrate or cellulosic matter may be used either alone or in combination with starch. The critical consideration is that the organic material be carbonizable and that it will act as a temporary binder to cement the granules until subsequent heating has sintered the clay, which acts as the permanent binder for the alumina particles that provide a porous substrate upon the pore walls of which the carbon generated from the organic matter is deposited.

Under some conditions it may be desirable to include finely divided active carbon in the batches used to make the adsorbents. Activated carbon may in such cases replace part of the clay or of the organic matter, or of both.

In general we have found the following proportions of raw materials, by weight, useful but we do not desire to be limited by them:

|  | Percent |
| --- | --- |
| Active carbon | 0–25 |
| Organic matter | 5–30 |
| Clay | 5–20 |
| Hydrated alumina | 50–90 |

Amounts of clay in excess of about 20 percent yield inferior products. We now believe that the best results are to be had with a batch of 75 percent hydrated alumina, 15 percent starch, and 10 percent clay.

Adsorbents of this type are suitably made by intimately mixing the hydrated alumina, clay and organic matter (and the active carbon, if any), gauging the mixture with water to obtain the desired plasticity, extruding the mixture through dies to develop the desired density and hardness, drying the extrudate and granulating it to the desired grist by milling and screening, and, finally, heating the granulated extrudate in the substantial absence of air to carbonize the organic matter and sinter the clay. In general, we prefer to heat the granulated extrudate to a temperature in the range from 1000° to 1400° F., preferably at 1200° F., but we are not limited to this range because some clays may require higher or lower temperatures to accomplish the desired sintering.

Heating as described dehydrates the alumina to produce the major substrate in a highly porous form through which carbon formed by pyrolysis of the starch is distributed, while the clay is sintered to bind the alumina granules.

Although compacting prior to drying and granulation can be accomplished by pelletizing or by ram-type extrusion, we prefer to use auger-type extruders for this purpose because they provide high intensity shearing stresses which accomplish intimate mixing of the ingredients and disintegrate any lumps of the ingredients which may have survived the mixing operation.

Because the sintered granules are substantially inert to dilute acids, the acid treatments to which reference will be made later do not weaken the structure of the grains. Moreover, the granules as made are more resistant to crushing and abrasion than those of bone char. As a consequence the rate of particle size deterioration in use is markedly less for our novel adsorbents than for bone char. This circumstance makes it practical to use the adsorbents of this invention in a much smaller particle size range than that of the bone char customarily injected into such char systems because the rate of production of particles too fine to permit satisfactory liquor flow is greatly diminished as a result of this invention. Thus, present refinery bone char stocks may contain particles ranging from those which will just pass through a four-mesh screen to those which will not quite pass a sixty-mesh screen. This is disadvantageous because a filter packed with granules of such varying sizes suffers from the tendency of the smaller particles to pack tightly between the larger ones. As a result, regions offering high resistance to fluid flow occur throughout the filter bed. These are by-passed by the liquors, which channel through the regions of low resistance. Consequently, little purifying action is obtained from the adsorbent in the regions of high resistance and the over-all performance of the filter is impaired.

By utilizing the adsorbents of high abrasion resistance and high crushing strength of the present invention it becomes practical to utilize a narrower range of particle sizes than was possible heretofore so that high-resistance packing does not occur and all regions of the filter bed are substantially equally accessible to the liquors. Instead of discarding adsorbent on the basis of fine particle size alone, little adsorbent need be discarded on this basis and the determining factor in discarding becomes the gradual loss of porosity which attends upon many cycles of use and regeneration. Because this loss in porosity is accompanied by an increase in particle density, discarding can be accomplished by means of an air classifier, such as the Sutton, Steele and Steele specific gravity table, which rejects particles of high density.

Additionally, the reduction in pressure drop which results from a filter bed made up of more closely sized particles permits the use of smaller sized new adsorbent, e.g., 10 x 28 mesh rather than 4 x 8 or 4 x 10 mesh. Because the performances of the smaller particles in removing impurities is superior to that of the larger ones, the quantity of liquor that can be purified to the desired extent with a filter bed of predetermined size is markedly enhanced. For example, under the same conditions a filter filled with 6 x 12 mesh particles will accomplish only about half the work that will be accomplished by an identical filter filled with 12 x 35 mesh particles.

In practicing our process for starch hydrolysate refining (based on the use of our adsorbents) we differ from present practice as follows:

According to present practice, at the end of the filtration operation and after displacing the liquor held in the filter with water, the filter full of adsorbent would be washed with at least several times its volume of hot water. At this point, in contrast, we wash with about two filter volumes of dilute hydrochloric acid, approximately 0.35 weight percent of HCl. This not only conditions our adsorbents with respect to pH, but also it assists in the regeneration process as such. We believe this is due to removal of nitrogenous compounds, probably proteinaceous in character, from the surface of the adsorbent, but whether or not this explanation is correct we have observed that this step is advantageous in that adsorbents so acid treated prior to reburning perform more effectively on subsequent use than do adsorbents reburned without the acid wash. Following the acid wash, water washing is continued in the usual way, the total volume of dilute acid and water required being no greater than that of the normal volume of wash water used in present refining operations.

After the acid and following water wash, the adsorbent of this invention is blown with air to minimize its water content, dried and reburned just as it is in current practice. Thereafter, it is returned to the filter and, without further treatment, is used for the filtration of additional liquor. In current practice it would be necessary to acid temper and water wash again at this point.

It should be noted that the adsorbents previously used in this type of refining cannot be applied to this process because, even if they were acid treated prior to washing, blowing with air, drying and reburning, they would, incidentally to reburning, develop excessive alkalinity and/or water soluble components which would require acid tempering and water washing to condition them for reuse. We repeat that the essence of this invention lies in the discovery that adsorbents of the type described above do not develop unsuitable characteristics as a result of reburning which require them to be acid tempered or water washed prior to use.

As evidencing the superior character of the products of this invention in comparison with bone char, reference may be made to tests conducted by a large commercial producer of corn syrup. This involved a column test in which the same corn syrup was used simultaneously in two columns one of which contained regular refinery process bone char and the other contained adsorbent in accordance with this invention. The latter was made from the preferred batch composition and processed as described above. In this test the contact time was 45 minutes; the syrup was 19° Bé. raw press liquor; and the flow rate was 500 cc./hr. The liquor from the tubes was concentrated to 43° Bé. and then heated at 90° to 92° C. for 16 hours (heat test). Color is measured by determining the transmittance at 420 millimicrons and applying the formula $$\text{Color} = \frac{100 - \text{percent transmittance}}{10}$$

The test data are:

|  | Adsorbent | |
| --- | --- | --- |
|  | This Application | Process char |
| Adsorbent volume, cc | 850 | 850 |
| Adsorbent weight, gm | 570 | 730 |
| Mesh-Tyler | 8 x 24 | 4 x 60 (approx.) |
| Average filtrate pH | 5.4 | 5.1 |
| Color after heat test: |  |  |
| 1,500–2,500 ml. fraction | 1.3 | 2.1 |
| 2,500–3,500 ml. fraction | 1.4 | 2.6 |
| 3,500–4,500 ml. fraction | 1.8 | 2.9 |
| 4,500–5,500 ml. fraction | 1.9 | 3.0 |
| 5,500–6,500 ml. fraction | 2.1 | 3.0 |

These data demonstrate the superiority in decolorizing power of our new adsorbents in comparison with standard industry bone char. Furthermore, their foaming characteristics are satisfactory.

It will be noted that because our new adsorbents do not contain a phosphatic substrate such as bone char does, and because they are not acid treated after reburning, the disadvantages attendant on the use of bone char or other apatite-based adsorbents due to calcium and phosphorous-bearing compounds will not be experienced with the adsorbents of this invention.

Also, it is believed that the charry taste and odor associated with liquors processed over bone char is related to the presence in bone char of nitrogenous pyrolysis products. The adsorbents of this invention contain no such products. This may be the reason that liquors from them are bland and free from these objectionable characteristics.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. In a method of depurating starch hydrolysate liquor, the step comprising passing said liquor through a bed of sintered granules of porous dehydrated alumina carrying carbon formed in situ by carbonization of an organic material and bonded by a naturally alkaline clay whereby undesired impurities are retained by said granules and the effluent is liquor of improved quality.

2. In a method of depurating starch hydrolysate liquor, the steps comprising passing said liquor through a bed of sintered granules of a major proportion of porous dehydrated alumina carrying carbon formed in situ by carbonization of an organic material bonded by a minor proportion of naturally alkaline clay, whereby undesired impurities are retained by said granules and the effluent is liquor of improved quality then washing said granules with dilute acid followed by water, then heating said granules, and returning the granules to said bed for direct use.

3. A method according to claim 2, said acid being dilute HCl.

4. A method according to claim 2, said granules having been formed from a batch consisting essentially of, by weight, about 5 to 20 percent of said clay, 5 to 30 percent of carbonizable organic matter, 50 to 90 percent of hydrated alumina, and 0 to 25 percent of activated carbon.

5. A method according to claim 4, said clay being an attapulgite clay, and said organic matter being starch.

6. Depurative adsorbent for treating starch hydrolysate liquor, said adsorbent being sintered granules of porous dehydrated alumina bonded by naturally alkaline clay and having carbon distributed therethrough.

7. Depurative adsorbent for treating starch hydrolysate liquor, said adsorbent being sintered granules of a major proportion of porous dehydrated alumina bonded by a minor proportion of naturally alkaline clay and having distributed therethrough carbon formed by carbonization of a carbonizable organic compound.

8. Depurative adsorbent for refining of starch hydrolysate liquor comprising sintered granules of batch comprising essentially, by weight, 5 to 20 percent of alkaline clay, 5 to 30 percent of carbonizable organic material, 50 to 90 percent of hydrated alumina, and 0 to 25 percent of activated carbon.

9. Adsorbent according to claim 8, said clay being an attapulgite clay.

10. That method of making an adsorbent for depurating starch hydrolysate liquor comprising mixing and granulating a major proportion of, by weight, hydrated alumina and minor proportions, by weight, of an alkaline clay and carbon-supplying material, and heating the granules to sinter said clay.

11. A method according to claim 10, said adsorbent being made from an intimate mixture of 5 to 20 percent of clay, 5 to 30 percent of carbonizable organic matter, 50 to 90 percent of said alumina, and 0 to 25 percent of activated carbon.

12. A method according to claim 11, said clay being an attapulgite clay.

References Cited in the file of this patent

UNITED STATES PATENTS

| | | |
|---|---|---|
| 962,841 | Hood | June 28, 1910 |
| 1,452,739 | Hood | Apr. 24, 1923 |
| 1,610,408 | Alexander | Dec. 14, 1926 |
| 2,211,727 | La Lande | Aug. 13, 1940 |
| 2,352,932 | Barrett et al. | July 4, 1944 |
| 2,504,169 | Wolfrom et al. | Apr. 18, 1950 |
| 2,524,414 | Wolfrom et al. | Oct. 3, 1950 |

OTHER REFERENCES

Analytical Chemistry Article, vol. 21, No. 1, January 1949, pp. 75–79.

Jour. of Pharmacy and Pharmacology, April 1952, pp. 217–226.

UNITED STATES PATENT OFFICE
CERTIFICATE OF CORRECTION

Patent No. 2,914,431

November 24, 1959

Elliott P. Barrett et al.

It is hereby certified that error appears in the printed specification of the above numbered patent requiring correction and that the said Letters Patent should read as corrected below.

Column 3, line 16, for "thereby imparting" read -- thereby impairing --.

Signed and sealed this 1st day of March 1960.

(SEAL)
Attest:
KARL H. AXLINE
Attesting Officer

ROBERT C. WATSON
Commissioner of Patents